United States Patent
Raju et al.

(10) Patent No.: US 9,063,819 B2
(45) Date of Patent: Jun. 23, 2015

(54) EXTENSIBLE PATCH MANAGEMENT

(75) Inventors: Satyanarayana D V Raju, San Ramon, CA (US); Sridhararao V. Kothe, Bangalore (IN); Sreenivas Devalla, Union City, CA (US); Nakka Siva Kishore Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 13/339,741

(22) Filed: Dec. 29, 2011

(65) Prior Publication Data

US 2012/0174086 A1 Jul. 5, 2012

Related U.S. Application Data

(60) Provisional application No. 61/429,149, filed on Jan. 2, 2011.

(51) Int. Cl.
| | |
|---|---|
| *G01L 15/00* | (2006.01) |
| *G06F 15/16* | (2006.01) |
| *G06F 15/173* | (2006.01) |
| *G06F 9/44* | (2006.01) |
| *G06F 9/445* | (2006.01) |
| *G06F 9/455* | (2006.01) |

(52) U.S. Cl.
CPC .............. *G06F 8/65* (2013.01); *G06F 9/45504* (2013.01)

(58) Field of Classification Search
CPC .............. G06F 8/65; G06F 8/67; G06F 8/68; G06F 8/71; G06F 8/665; G06F 9/44536; G06F 9/4425; G06F 11/1464; G06F 11/1469; G06F 17/30306
See application file for complete search history.

(56) References Cited

U.S. PATENT DOCUMENTS

| | | | |
|---|---|---|---|
| 7,058,968 B2 | 6/2006 | Rowland et al. | |
| 7,735,078 B1* | 6/2010 | Vaidya | 717/171 |
| 7,870,547 B2 | 1/2011 | Schuft et al. | |
| 7,926,033 B2 | 4/2011 | Gopal et al. | |
| 2004/0003266 A1* | 1/2004 | Moshir et al. | 717/168 |
| 2005/0188068 A1* | 8/2005 | Kilian | 709/223 |
| 2005/0256664 A1* | 11/2005 | Blumfield et al. | 702/121 |
| 2005/0257207 A1* | 11/2005 | Blumfield et al. | 717/168 |
| 2005/0257208 A1* | 11/2005 | Blumfield et al. | 717/168 |
| 2006/0048130 A1* | 3/2006 | Napier et al. | 717/168 |
| 2007/0106978 A1* | 5/2007 | Felts | 717/124 |
| 2007/0106979 A1* | 5/2007 | Felts | 717/124 |
| 2007/0106980 A1* | 5/2007 | Felts | 717/124 |
| 2007/0113225 A1* | 5/2007 | Felts | 717/172 |
| 2007/0168861 A1* | 7/2007 | Bell et al. | 715/701 |
| 2008/0114860 A1* | 5/2008 | Keys et al. | 709/219 |
| 2008/0178167 A1* | 7/2008 | Sriram et al. | 717/169 |
| 2008/0178168 A1* | 7/2008 | Sriram et al. | 717/169 |
| 2009/0193074 A1* | 7/2009 | Lee | 709/203 |
| 2009/0222811 A1* | 9/2009 | Faus et al. | 717/173 |
| 2009/0259999 A1* | 10/2009 | Srinivasan | 717/170 |
| 2011/0265076 A1* | 10/2011 | Thorat et al. | 717/172 |
| 2012/0102480 A1* | 4/2012 | Hopmann et al. | 717/172 |

\* cited by examiner

*Primary Examiner* — Don Wong
*Assistant Examiner* — Anibal Rivera
(74) *Attorney, Agent, or Firm* — Edell, Shapiro & Finnan, LLC

(57) ABSTRACT

Extensible patch management provides mechanisms by which data, database and binaries for one or more components of an application may be updated. The patch framework extends patch related functionality at different devices as needed to perform a software patch in a manner that allows such functionality to be retained at the device. Additionally, the patch framework is platform independent and thus allows the same patch related software to be distributed and executed across different platforms.

17 Claims, 7 Drawing Sheets

```xml
<Catalog identifier="patch_test">
  <Title>Adding new Datasets for DPE</Title>
  <Description>
  <![CDATA[
    This patch will install the following datasets into the DPE.<br/>
    <ul>
      <li>Show Running Configuration (CLI)</li>
      <li>Show version (CLI)</li>
      <li>Show Inventory (CLI)</li>
      <li>Entity MIB (SNMP)</li>
      <li>Asset MIB (SNMP)</li>
    </ul>
    <br/> To install patch select 'Install Patch' option. ]]>
  </Description>
  <PatchItemList>
    <PatchItem identifier="1">
      <Title> Datasets </Title>
      <ScriptFile>patch.xml</ScriptFile>
    </PatchItem>
  </PatchItemList>
</Catalog>
```

FIG.3

```xml
<?xml version="1.0"?>
<project default="main">
        <target name="newdb_support">
                <taskdef name="MySQLUpgrade"
                    classname="com.pari.client.newdb.DBUpgrader"
                    classpath="newdb"/>
        </target>
        <target name="main" >
            <MySQLUpgrade force="true", ignoreErrors="false" />
            <echo message="APP_HOME is ${APP_HOME}" />
            <API ignoreErrors="true">
                    <fileset dir="./install/xml" casesensitive="yes">
                        <include name="**/*.xml"/>
                    </fileset>
            </API>
        </target>
</project>
```

FIG.5

```
package com.pari.patch.tasks;

//import VARIOUS PACKAGE MEMBERS import org.apache.tools.ant.Task;

//...

public class API extends Task
{
    private boolean        ignoreErrors = false;
    private String         file         = null;
    private ArrayList<FileSet> filesets = new ArrayList<FileSet>();

//OTHER FIELDS ...
                                                              610
    public void execute() throws BuildException
    {
        //CODE FOR TASK
    }

//OTHER CODE                                612
    public void setIgnoreErrors(boolean ignoreErrors)
    {
        this.ignoreErrors = ignoreErrors;
    }
                                          614
    public void setFile(String file)
    {
        this.file = file;
    }
                                          616
    public void addFileset(FileSet fileset)
    {
        filesets.add(fileset);
    }
}
```

EXTENSIBLE PATCH MANAGEMENT

RELATED APPLICATION DATA

The present application claims benefit of U.S. Provisional Patent Application 61/429,149 entitled, "Patching Network and Security Management Software Components using Apache Ant," filed on Jan. 2, 2011, the entire disclosure of which is incorporated herein by reference.

TECHNICAL FIELD

The present disclosure relates to managing software patches and activities by which such patches are applied.

BACKGROUND

A software patch, as used herein, is software that is intended to change the functionality of and/or data stored on processing equipment by applying repairs, upgrades and the like to software, which, as used herein, refers to processor-executable instructions and data arranged by a programmer to implement such functionality. Managing software patch installations across numerous devices, particularly in widespread distributed configurations of diverse equipment, can be quite cumbersome. This is particularly true when certain operations must be performed at different devices prior to and during the installation of the patch and yet such operations are not supported in the devices as deployed. When such functionality is not available at a device, it may not be possible to install the patch without first replacing or patching the underlying patch framework. When numerous devices are implemented on many different computing platforms, the platform dependency of each patch framework of the devices can render wide distribution and installation of a simple patch into an enormously complex procedure.

BRIEF DESCRIPTION OF THE DRAWINGS

FIG. 3 is an example of an example catalog file for extensible patch management.

FIG. 5 is a further example of a script file for extensible patch management.

FIG. 6 is an example of coding an interface by which parameters may be passed from the script file to the task code in extensible patch management.

DESCRIPTION OF EXAMPLE EMBODIMENTS

Overview

A list of tasks for applying a software patch is received by a data processing device. A determination is made as to whether a task declared in the list is supported by code on the data processing device. If the task is unsupported through code at the data processing device, the task code therefor is acquired and is executed to perform the task with other tasks in the list to apply the patch.

Example Embodiments

Figure 1:
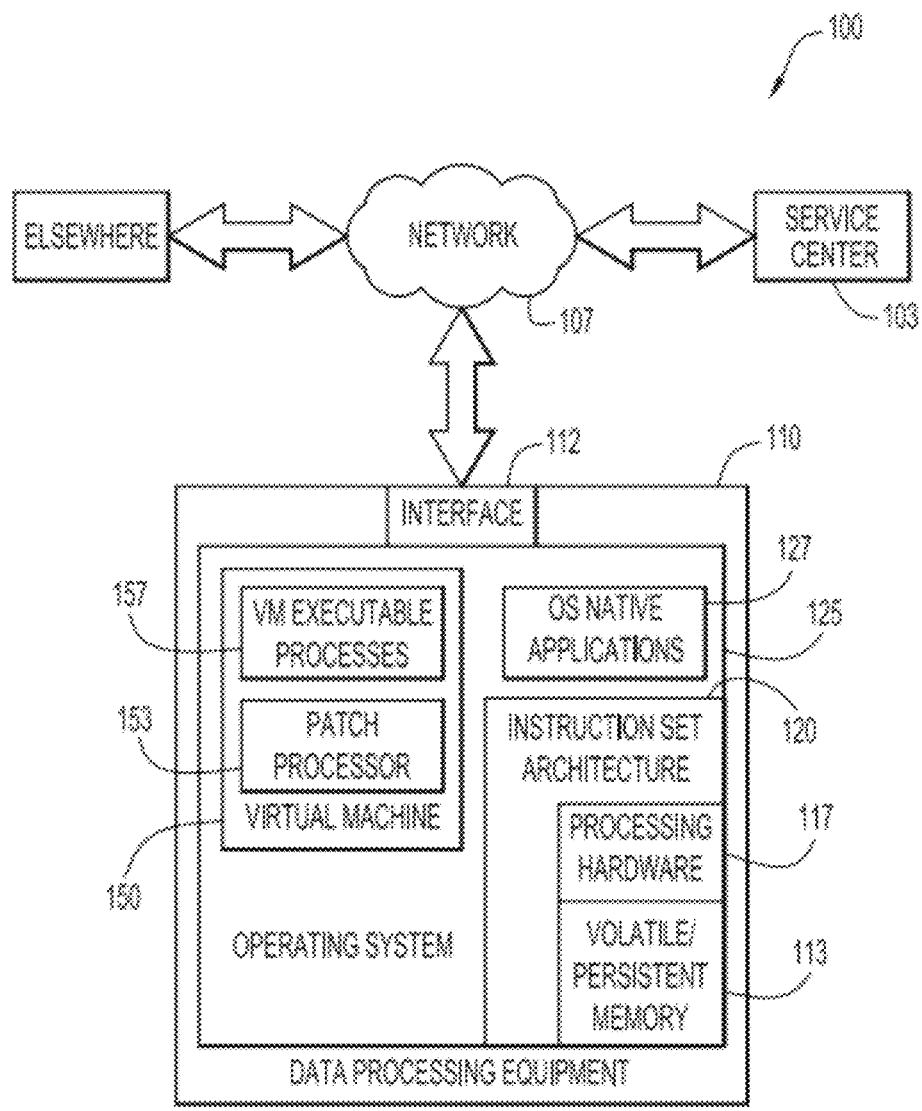
FIG. 1 is a schematic block diagram of an extensible patch management implementation.

In FIG. 1, an example distribution network 100 is illustrated as including a plurality of network node devices communicatively coupled via a communications network 107. The techniques described herein are not limited to any particular type of equipment implementing a network node device, and a wide variety of programmed processing equipment may be updated and/or repaired thereby. In the example of FIG. 1, the network node devices include a service center 103, which may provide services to other network node devices, such as data processing equipment (DPE) 110. At various times, service center 103 may determine that a software patch may be relevant to software executing on DPE 110. Such determination may be through, for example and without limitation, engineering changes, problem reports from the field, routine software upgrades, etc. When so needed, service center 103 may package a software patch and distribute the package through telecommunications network 107. DPE 110 may include a communications interface 112 through which communications through network 107 are achieved and through which the patch package is received thereat.

DPE 110 may include volatile/persistent memory 113, processing hardware 117, instruction set architecture (ISA) 120, and operating system (OS) 125. Processing hardware 117 contains the necessary electronic circuitry for carrying out processing instructions provided thereto as electrical signals. Memory 113 includes all available memory, both volatile and persistent, for storing processor-executable instructions and data. ISA 120 provides an interface to memory 113 and processing hardware 117, by which suitably programmed machine code and/or data for storage is converted to the afore-mentioned electrical signals and provided to memory 113 and processing hardware 117, as appropriate.

OS 125 provides common services to applications, which, as used herein, refers to software instances executing under OS 125. Applications or processes that can be executed directly under OS 125 are referred to herein as natively executable. For software that cannot be directly executed under OS 125, an OS compliant virtual machine (VM) 150 may be executed, which, as used herein, refers to a natively executable process that renders a non-native application executable thereon. That is, VM-executable processes 157 may comprise bytecode that is executable only under VM 150. When so embodied, VM-executable processes 157 are considered portable, in that they can execute unaltered on different and distinct computing platforms, regardless of memory 113, hardware 117, ISA 120 and OS 125 provided such platform implements VM 150.

Patch processor 153 may be instantiated upon a patch package being received at DPE 110 to process the package and install its contents. Patch processor 153 may achieve such functionality through processor-executable processes referred to herein as tasks. Extensible patch management implements tasks through pieces of platform-independent software, such as JAVA, referred to herein as task code. It is to be understood that code, as used herein, is synonymous with software and refers to executable instructions in a particular form, e.g., bytecode for a virtual machine and machine code for direct execution by a processor. It is to be understood that the sense of the term code should be taken from the context in which it is used herein. Accordingly, task code is bytecode or machine code, depending on the environment in which it is to be executed, that is arranged, such as by programming, to perform a given task. Similarly, patch code is byte code or machine code, depending upon the environment in which it is to be executed, that is arranged, such as by programming, to execute as part of the software to which it is applied as a patch.

The extensible patch management techniques described herein may apply software patches to OS native applications 127 and/or VM executable processes 157. Regardless of the software being patched, the patch may be applied through patch processor 153 executing on VM 150. Thus, patch processor 153 is platform independent and yet can apply patches to native and non-native applications alike. Moreover, extensible patch management provides mechanisms by which patch-related tasks that are not available at DPE 110 can be extended thereto when the need for such is made apparent. For example, if DPE 110 is not equipped with a mechanism to shut down a native application 127 in order to apply a patch thereto, the necessary code for doing such may be provided to DPE 110, such as in the package with the patch code, and executed at patch runtime. Moreover, once such task code has been provided to DPE 110, it may remain available thereat to support subsequent patches.

Certain functionality of the extensible patch management described herein may be implemented by a platform-independent automated build application, such as APACHE ANT. APACHE ANT is an open-source, platform-independent automated build processor designed for software projects written in JAVA. In that it operates under the JAVA virtual machine and implements many native tasks that can be utilized for applying software patches, APACHE ANT may be adapted to embody a functional patch processor 153. APACHE ANT implements means by which custom tasks may be incorporated into the build process and by which unimplemented tasks can be embodied. It is to be understood that although the example patch processor/build process is APACHE ANT, the underlying functionality provided thereby may be fulfilled in many different ways, including by other build processes and through direct programming.

Figure 2:
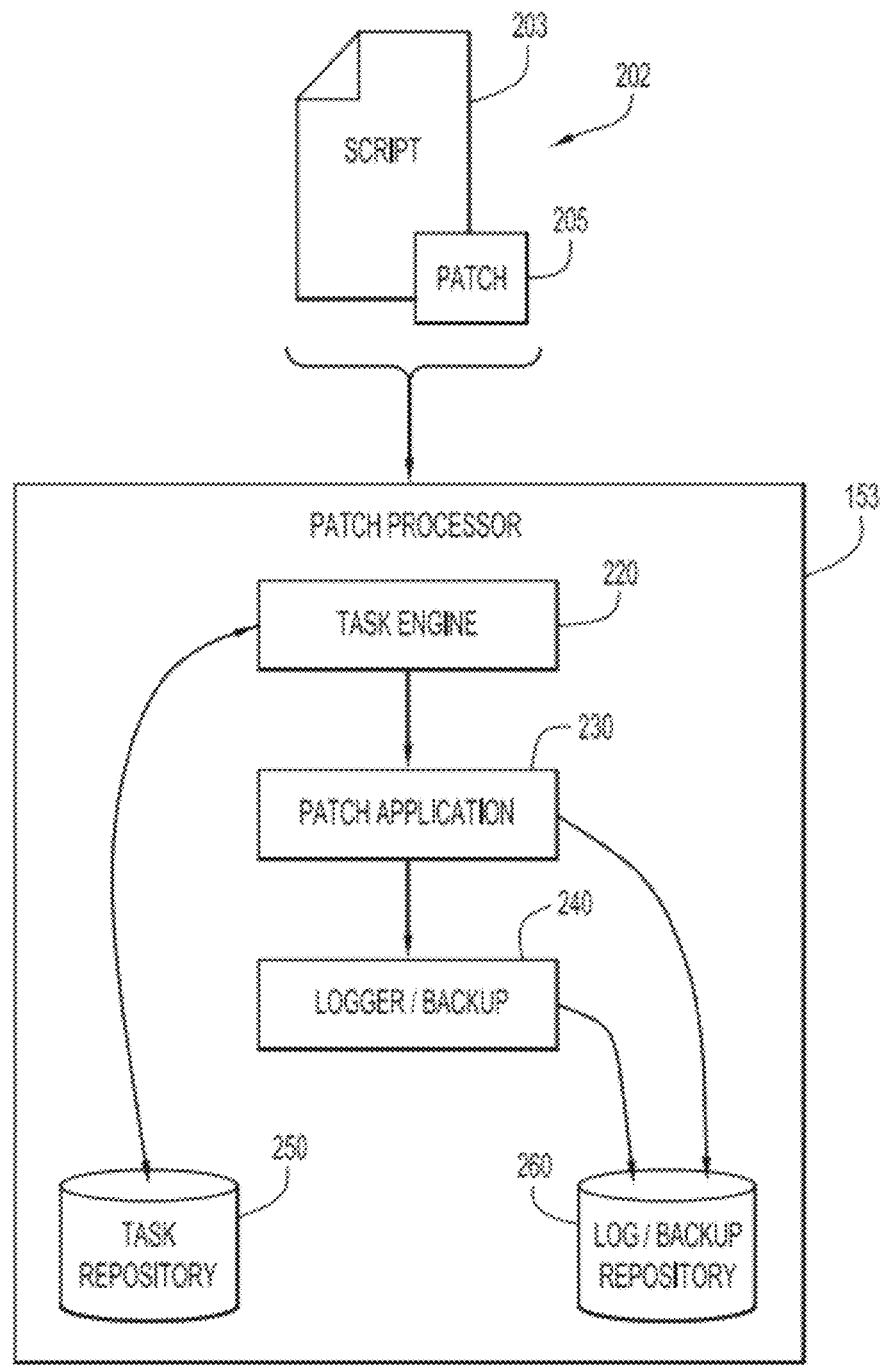
FIG. 2 is a schematic block diagram of a patch processor and may be used in conjunction with extensible patch management.

FIG. 2 illustrates an example of patch processor 153. Whereas, the functionality of patch processor 153 is illustrated in FIG. 2 as separate functional units, such is solely for purposes of description. Moreover, the ordinarily skilled artisan will recognize and appreciate the correlation and differences between base functionality of APACHE ANT from the context and the description herein as well as extensions thereof by which the principles of the extensible patch framework may be embodied.

Script files 203 may be provided to task engine 220, whereby the text contained therein is parsed and executed in a manner consistent with a software build. That is, script file 203 may be constructed in a standardized format, such as through the extensible markup text (XML) format, and provided to the build engine of APACHE ANT, by which the tasks defined therein are performed in a prescribed order. Such tasks may establish the environment in which the patches may be applied, such as shutting down various processes, installing new task code, deleting temporary files, and so on. Patch application process 230 installs the patch code 205 in the appropriate locations, such as in memory 113, in accordance with the tasks and other information provided in script files 203. Additionally, task code may be maintained in task repository 250 and may be updated with new task code per the extensible patch management techniques described herein. Patch processor 153 may include a logger/backup processor 240 by which activities and associated messages relating to the application of the patch are formatted and stored in log/backup repository 260. The logged data may be provided to service center 103 to inform interested personnel of the success or failure of the patch. Logger/backup processor 240 may additionally backup all applications and system states onto log/backup repository 260 so that the system may be rolled back to a previous state.

Through the extensible patch management described herein, script files 203 may include definitions of new tasks, i.e., that are not supported by patch processor 153 in its previously configured state. For example, if DPE 110 was deployed without the capability of shutting down a certain application and such shutdown was required to install a patch, script files 203 and patch files 205 may include the necessary instructions and task code to implement the shutdown process. Moreover, the patch processor 153 may retain the task code in task repository 250 so that the shutdown task is supported by DPE 110 for future patches.

Patch package 202 may include a catalog file 300, as illustrated in FIG. 3 that describes the nature of the patch and its contents to the end user. Catalog file 300 has various informative elements that are used to identify the patch and a description of the content of package 202. As illustrated in FIG. 3, elements of a patch are specified in a PatchItem field. For example, PatchItem 310 identifies that the corresponding patch is to Datasets and that the patch is to be carried out through a file referenced in ScriptFile field 312, i.e., patch.xml.

Figure 4:
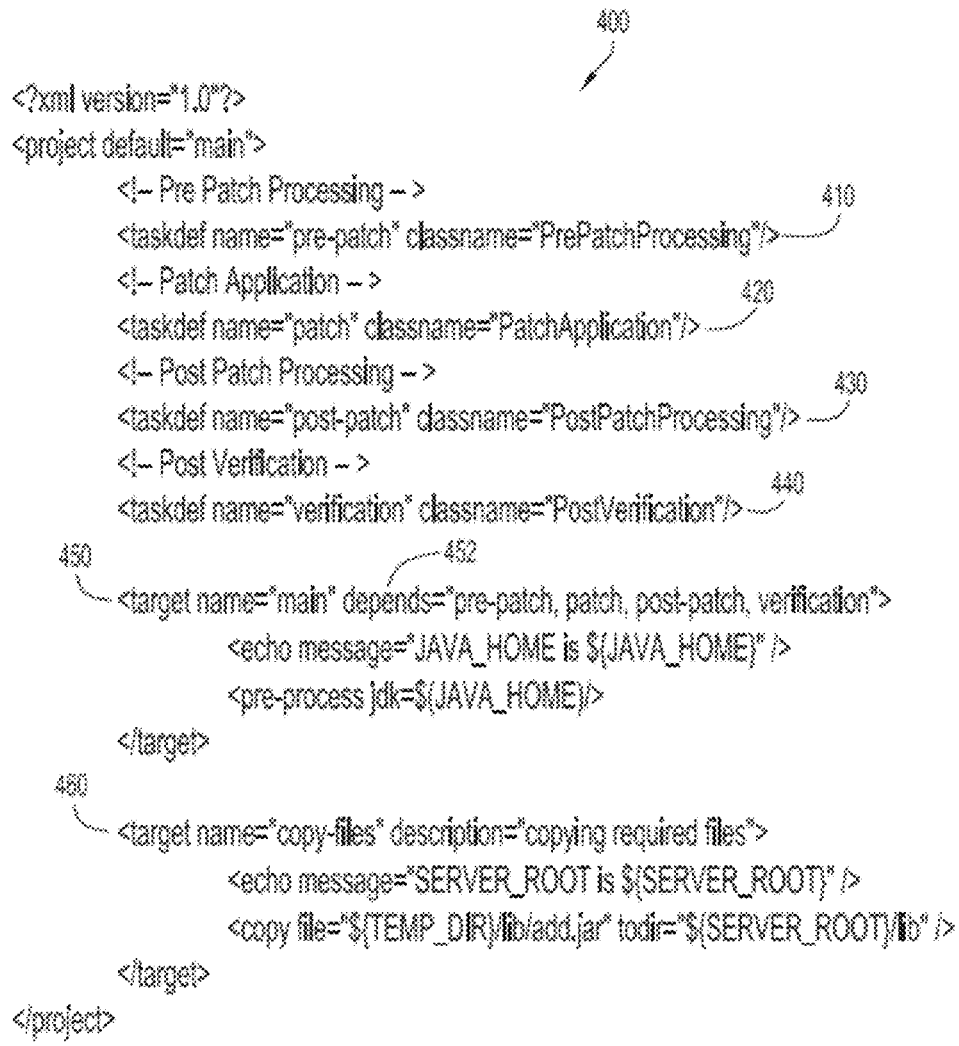
FIG. 4 is an example script file by which tasks may be performed in extensible patch management.

FIG. 4 depicts an example of a script file 400, patch.xml, in which tasks may be defined to establish the environment in which the patch is applied, to apply the patch and to remove unnecessary artifacts that remain after the patch has been applied. As illustrated in the figure, script file 400 lists a series of task definitions for pre-patch processing 410, patch application 420, post patch processing 430 and post verification 440. The task definitions provide references to JAVA classes that implement the corresponding task.

When embodied through APACHE ANT and other build-based techniques, tasks may be launched and executed through target structures, such as main target 450 and copy-files target 460. Dependencies in the target structures, such as is expressed by depends statement 452, ensure that tasks are performed in the proper order, i.e., certain prerequisite tasks are completed prior to applying the patch. In target 460, which is not dependent on other tasks, but appears last in the script file 400, the task code and patch code, which may be installed in a temporary directory upon unpacking package 202, may be copied into a known location on DPE 110 from which they can be retrieved and executed through the copy-files target subsequent to the main target completing. The ordinarily skilled artisan familiar with automated software build processes will recognize the manner in which the ordering of tasks in script file 400 can be controlled through proper structuring of the target, depends, and other build statements therein.

FIG. 5 illustrates a further example of a script file 500 that extends the capabilities of DPE 110. As is illustrated at target block 510, the task, MySQLUpgrade is defined, whereby task engine 220 is informed that the associated task code is provided in the JAVA class, com.pari.client.newdb.DBUpgrader, as illustrated at 512. The task code of the JAVA class com.pari.client.newdb.DBUpgrader may be stored in task repository 250 as part of the unpacking of patch package 202 and is made available thereby for execution of the new task, MySQLUpgrade, which is performed in the main target block 520, as is illustrated at line 522. At line 524, the API task, which may have been installed at DPE 110 in a previous patch, may be executed through associated task code already present in task repository 250. In this manner, i.e., making new task code available at DPE 110 as new requirements become known, extensible patch management extends patch related functionality as needed.

In certain embodiments, such as when implemented through a build process like APACHE ANT, the parser thereof must pass parameters from the script to the task code. For example, at line 524, the task API utilizes attributes ignoreErrors, fileset, and include. APACHE ANT provides for parameter passing in the task code of custom tasks through a predefined entry interface. Referring to FIG. 6, there is illustrated a source code file 600 that exemplifies parameter passing for the API task in line 524 of FIG. 5. The instructions for performing the task itself may be inserted in the execute( ) method 610. Parameters may be handled through methods 612, 614, 616, which have a predefined format for implementation. For example, the attribute ignoreErrors is provided with a so-called setter method 612, the name of which is formed from the attribute name, ignoreErrors, prefixed with the word set in lowercase. Accordingly, task engine 220 will pass the value of the ignoreErrors attribute assigned in the script file 500 to the setignoreErrors setter method 612 in the task code. Implementations of task engine 220 in other than through APACHE ANT may have other interface requirements for passing parameters from a script file into machine code and/or bytecode, as will be readily understood by the ordinarily skilled artisan.

Figure 7:
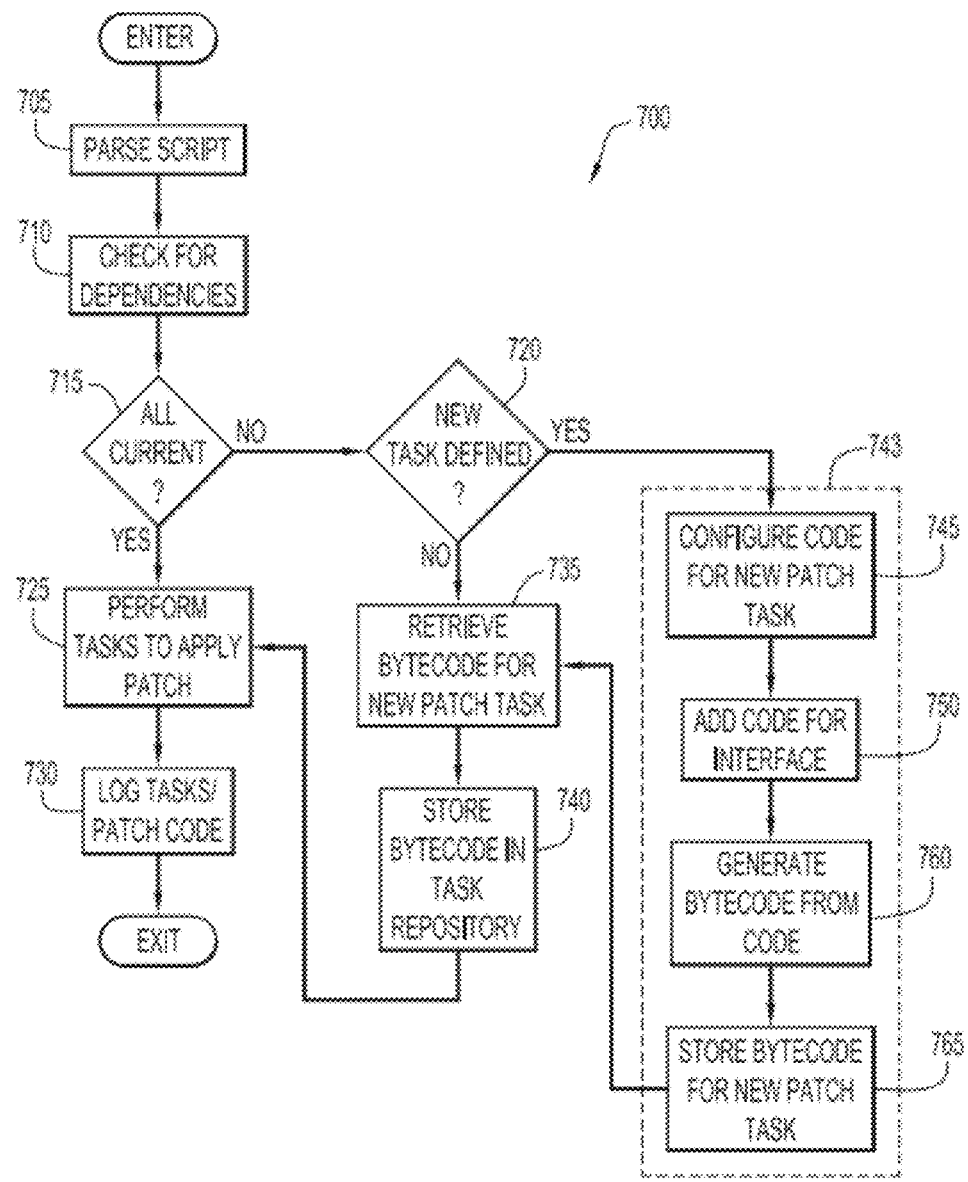
FIG. 7 is a flow diagram of an example extensible patch management process.

In FIG. 7, there is illustrated a flow diagram of an extensible patch management process 700. In operation 705, the script file containing the instructions for applying the patch is parsed and the task dependencies are evaluated in operation 710 to establish the order of tasks. That is, if new tasks are defined in the script file, such should be processed prior to performing any task that relies on the task code of the new task. If the task code for all tasks is current, i.e., the state of task repository 250 is current, task engine 220 determines if a new task is defined in operation 720. If so, operations 743 are executed and may be performed off-line i.e., prior to the task code being delivered to DPE 110. In operation 745, the code for the new patch is authored and the interface code, if any, for passing parameters and the like is added in operation 750. Bytecode for the task is generated, such as through compiling, in operation 760 and stored in operation 765. The stored bytecode may then be delivered to various DPE as needed, as illustrated at operation 735. The task code may then be stored in the proper location in the task repository 250 in operation 740. When the task repository is current, either subsequent to being extended with new task code or upon a positive determination thereof in operation 715, the tasks in the script file are performed in operation 725 to apply the corresponding patch. The patching activities, such as identification of the tasks performed, errors encountered, etc. are logged in operation 730 and the patch code is added to the log/backup repository 264.

Memory 113 may comprise read only memory (ROM), random access memory (RAM), magnetic disk storage media devices, optical storage media devices, flash memory devices, electrical, optical, or other physical/tangible memory storage devices. The processor 117 is, for example, a microprocessor or microcontroller that executes instructions for the extensible patch management logic. Thus, in general, the memory 113 may comprise one or more tangible (non-transitory) computer readable storage media (e.g., a memory device) encoded with software comprising computer executable instructions and when the software is executed (by the processor 117) it is operable to perform the operations described herein in connection with patch processor logic 153.

The above description is intended by way of example only.

What is claimed is:

1. A method comprising:
  receiving by a data processing device a list of tasks that define a patch for application at the data processing device;
  instantiating a virtual machine on the data processing device for use in applying the patch;
  determining whether a task declared in the list of tasks is unsupported by bytecode currently associated with the virtual machine;
  upon determining that a task is unsupported by the bytecode currently associated with the virtual machine, obtaining additional bytecode to implement the unsupported task; and
  executing the additional bytecode at the virtual machine to perform the unsupported task with other tasks in the list to apply the patch.

2. The method of claim 1, wherein executing the additional bytecode includes:
  instantiating a task performing process in the virtual machine, the task performing process comprising:
    providing the list of tasks as human readable text in a script file;
    parsing the script file to generate instructions executable by the virtual machine, the instructions including an address by which the virtual machine locates the bytecode of the unsupported task; and
    executing the generated instructions by the virtual machine.

3. The method of claim 2, further comprising:
  instantiating an automated software build process to perform the task performing process.

4. The method of claim 3, further comprising:
  extending the bytecode by which the unsupported task is performed with bytecode of a predefined entry interface prescribed by the software build process.

5. The method of claim 1, further comprising:
  storing the additional bytecode in a task repository at the data processing device such that the additional bytecode is retrievable therefrom to support application of subsequent patches.

6. The method of claim 1, wherein instantiating the virtual machine includes:
  instantiating the virtual machine on the data processing device as a process independently executable of a system process to which the patch is applied.

7. The method of claim 6, further comprising:
  performing as one of the tasks in the list a termination of the system process while the virtual machine remains executing on the data processing device.

8. The method of claim 7, further comprising:
  performing as another one of the tasks in the list subsequent to the execution of the bytecode a restart of the system process while the virtual machine remains executing on the data processing device.

9. An apparatus comprising:
  an interface to receive a list of patch tasks for applying a patch;
  a memory;
  a processor to execute processor executable instructions that, when so executed, configure the processor to:
    instantiate a virtual machine on the data processing device for use in applying the patch;
    determine whether all tasks declared in the list of tasks are supported by bytecode currently associated with the virtual machine and stored in the memory;

upon a positive determination that a task in the list of tasks is unsupported by the bytecode currently associated with the virtual machine, obtain additional bytecode to implement the unsupported task;
execute the additional bytecode at the virtual machine to perform the unsupported task with other tasks in the list to apply the patch.

10. The apparatus of claim 9, wherein the processor is further configured to:
instantiate a task performing process in the virtual machine;
provide the list of tasks as human readable text in a script file to the task performing process;
parsing the script file in the task performing process to generate instructions executable by the virtual machine, the instructions including an address by which the virtual machine locates the bytecode of the unsupported task; and
execute the generated instructions by the virtual machine.

11. The apparatus of claim 10, wherein the processor is further configured to:
instantiate an automated software build process to perform the task performing process.

12. The apparatus of claim 11, further comprising:
other memory in which to extend the bytecode by which the unsupported task is performed with bytecode of a predefined entry interface prescribed by the software build process.

13. The apparatus of claim 9, wherein the processor is further configured to:
store the additional bytecode in the memory such that the additional bytecode is retrievable therefrom in support of application of subsequent patches.

14. The apparatus of claim 9, wherein the processor is further configured to:
instantiate the virtual machine on the data processing device as a process independently executable of a system process to which the patch is applied.

15. A non-transitory computer readable medium having instructions encoded thereon that, when executed by a processor, are operable to cause the processor to:
receive by a data processing device a list of tasks that define a patch for application at the data processing device;
instantiate a virtual machine on the data processing device for use in applying the patch;
determine whether a task declared in the list of tasks is unsupported by bytecode currently associated with the virtual machine;
upon determining that a task is unsupported by the bytecode currently associated with the virtual machine, obtain additional task code to implement the unsupported task; and
execute the additional bytecode at the virtual machine to perform the unsupported task with other tasks in the list to apply the patch.

16. The non-transitory computer readable medium of claim 15, comprising further instructions that cause the processor to:
instantiate a task performing process in the virtual machine, the task performing process comprising:
providing the list of tasks as human readable text in a script file;
parsing the script file to generate instructions executable by the virtual machine, the instructions including address by which the virtual machine locates the bytecode of the unsupported task; and
executing the generated instructions by the virtual machine.

17. The non-transitory computer readable medium of claim 15, comprising further instructions that cause the processor to:
instantiate an automated software build process to perform the task performing process.

* * * * *